United States Patent [19]
Komatsu et al.

[11] Patent Number: 5,852,734
[45] Date of Patent: *Dec. 22, 1998

[54] METHOD AND COMPILER FOR PARALLEL EXECUTION OF A PROGRAM

[75] Inventors: Hideaki Komatsu, Yokohama; Kazuaki Ishizaki, Tokyo-to; Osamu Gohda, Yokohama, all of Japan

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 489,196

[22] Filed: Jun. 9, 1995

[30] Foreign Application Priority Data

Jul. 6, 1994 [JP] Japan .................................. 6-154942

[51] Int. Cl.$^6$ ......................................... G06F 9/45
[52] U.S. Cl. ............................................. 395/707; 595/709
[58] Field of Search ................................... 395/709, 706, 395/705, 707

[56] References Cited

U.S. PATENT DOCUMENTS

| | | | |
|---|---|---|---|
| 5,274,818 | 12/1993 | Vasilevsky et al. ................... | 395/705 |
| 5,303,357 | 4/1994 | Inoue et al. ............................ | 395/709 |
| 5,367,651 | 11/1994 | Smith et al. ............................ | 395/709 |
| 5,450,585 | 9/1995 | Johnson ................................. | 395/709 |
| 5,457,799 | 10/1995 | Srivastava ............................. | 395/709 |
| 5,485,619 | 1/1996 | Lai et al. ................................ | 395/706 |
| 5,491,823 | 2/1996 | Ruttenberg ............................ | 395/709 |
| 5,522,074 | 5/1996 | Endo ...................................... | 395/709 |

FOREIGN PATENT DOCUMENTS

| | | | |
|---|---|---|---|
| 61-182161 | 8/1986 | Japan .............................. | G06F 15/16 |
| 04-184540 | 7/1992 | Japan .............................. | G06F 15/16 |
| 05-158895 | 6/1993 | Japan .............................. | G06F 15/16 |

OTHER PUBLICATIONS

Mercer, R., "The Convex Fortran 5.0 Compiler," IEEE, ICS '88, vol. 2, pp 164–175, May 20, 1988.

Hiranandani et al., "Compiling Fortran D for MIMD distributed–memory machines," Comm. of ACM, v35, n8, p. 66(15), Aug. 1992.

Choudhary et al., "Compiling Fortran 77D and 90D for MIMD distributed–memory machines," IEEE, 4th Symp. on the Fronts. of Mass. Para. Comp., pp. 4–11, Oct. 21, 1992.

Ramanujam et al., "Tiling multidimensional iteration spaces for multicomputers," IEEE, Jour. of Para. and Dist. Comp., vol. 16, No. 2, pp. 108–120, Oct. 1992.

Hiranandani et al., "Preliminary experiences with Fortran D compiler," IEEE, Supercomputing '93, pp. 338–350, Nov. 19, 1993.

Kennedy et al., "Context optimization for SIMD execution," IEEE, Proc. of the Scale. HP Comp. Conf., pp. 445–453, May 25, 1994.

(List continued on next page.)

*Primary Examiner*—Emanuel Todd Voeltz
*Assistant Examiner*—Peter J. Corcoran, III
*Attorney, Agent, or Firm*—Floyd A. Gonzalez

[57] ABSTRACT

To increase the speed of program execution by decomposing a loop onto a plurality of processors and executing them in parallel. First, a loop in a source program is located which is to be executed in parallel. This loop is then analyzed for data dependence. The result of the analysis is used for calculating data dependence vectors. Then all areas of the index executed in the loop are decomposed and assigned to a number of processors. Further, it is determined whether data needs to be transferred between processors. Based on the array index space, communication vectors are calculated. Data dependence vectors and communication vectors are ANDed to calculate communication dependence vectors. Then, the manner of communication of operands and loop execution are determined based on the values of communication dependence vectors.

16 Claims, 3 Drawing Sheets

OTHER PUBLICATIONS

Choudhary et al., "Compiling Fortran 77D and 90D for MIMD Distributed–Memory Machines," IEEE Comp. Soc. Press, Los Alamitos, CA, pp. 4–11, Oct. 19, 1992.

Kennedy et al., "Context Optimization for SIMD Execution," IEEE Comp. Soc. Press, Los Alamitos, CA, pp. 445–453, May 23, 1994.

IEEE Transactions on Parallel and Distributed Systems, vol. 2, No. 4, Oct. 1991 A Loop Transformation Theory and an Algorithm to Maximize Parellelism.

METHOD AND COMPILER FOR PARALLEL EXECUTION OF A PROGRAM

FIELD OF THE INVENTION

This invention relates to a technique for increasing the speed of program execution by decomposing a loop onto a plurality of processors and executing them in parallel in a computer system having memory areas distributed in such processors.

DESCRIPTION OF THE PRIOR ART

Conventional parallelism detection techniques have been implemented by determining given constraints for executing a given program while maintaining the meaning of the program. Given constraints can be data dependent or control dependent. To take into account parallelism of a large scale, it is generally necessary to analyze a loop and its data dependence and use the result of the analysis to extract parallelism. There are two kinds of data dependence which are most important and must be considered for parallel operations of loops:

true dependence: constraint from the production of data to its consumption; and anti dependence: constraint from the consumption of data to its production.

True dependence is also called "flow dependence". The following description will collectively use the terms: true dependence and anti dependence.

True dependence is the constraint that the data required for calculation must be calculated in advance, while anti dependence is the constraint that the data required for calculation must be used before recalculation of it. For loop parallelism, either dependence is represented by a data dependence vector, which represents the distance of a dependent execution with the difference between the values of loop variables. To further explain the dependence vector:

For example, in the loop:

```
DO I=. . .
  DO J=. . .
``` if the data dependence requires $(I,J)=(1,1)$ to be executed before $(1,2)$ is done, it is said that there is a dependence vector of $(1,2)-(1,1)=(0,1)$. In addition, if the data dependence requires $(I,J)=(2,2)$ to be executed before $(3,1)$ is done, it is said that there is a dependence vector of $(3,1)-(2,2)=(1,-1)$. In particular, if an element of a dependence vector has a negative value, as in equation $(3,1)-(2,2)=(1,-1)$, the dependence vector is said to have a negative value.

EXAMPLE PROGRAM 1

```
DO I=1,100
  A(I)=A(I-1)+A(I+1)
END DO
```

In this program, calculating $A(I)$ requires a read of $A(I-1)$, which in turn requires calculation of $A(I-1)$ be completed at the time of calculation of $A(I)$. This is called true dependence. Reading of $A(I+1)$ must be executed before calculation of $A(I+1)$. This is called anti dependence, and its dependence vector is also 1. Analyzing these dependences will decompose the loop into the following two:

do-all
do-across

A do-all loop is a loop where data dependence does not span the repetitions of the loop, i.e. the loop is independent on either true dependence or anti dependence, and can be executed in parallel. An example of do-all loop is as follows:

EXAMPLE PROGRAM 2

```
DO I=1,100
  DO J=1,100
    A(I,J)=A(I,J)+B(I,J)
  END DO
END DO
```

On the other hand, a do-across loop is a loop where either true dependence or anti dependence or both exist, i.e. the loop which has data dependence spanning the repetitions of the loop, and which cannot readily be executed in parallel without some optimization.

An optimization technique (a type of loop transformation, represented by uni-modula transformation) has been known in the prior art which removes dependence by altering the index space of a do-across loop. This technique is effective with multi-processors which share memory. With such parallel operation technique, it is necessary for a distributed multi-processor system which does not share memory to redistribute the array possessed by each processor to meet the alteration of index space. Such processing is very costly in a distributed multi-processor system, and may counteract the advantages of parallel operations. That is, in distributed multi-processors which do not share memory, redistributing the array possessed by each processor means that each processor receives from another processor the array element required by each in interprocessor communication. For distributed multi-processors which do not share memory, the time spent in interprocessor communication will be a very large penalty, compared to the time spent in accessing the array possessed by each processor.

Means for optimizing a do-across loop for distributed multi-processors include the following two:

Pipelining; and

Prefetching.

Prefetching is a technique used against anti dependence to avoid data dependence by sending and receiving all the data required before the execution of a loop. This enables parallel execution of a program having anti dependence.

Pipelining is a technique used against true dependence to send a message to a required processor after the calculation of required data has been completed and to have the receiving processor start processing when the message arrives.

Advantages of pipelining are:

(1) The processor which has received the message can start the next processing; and (2) Pipelining for nested loops enables parallel operations of the processors which have no data dependence.

EXAMPLE PROGRAM 3

```
*HPF$ PROCESSORS P(10,10)
*HPF$ DISTRIBUTE A(BLOCK,BLOCK) onto P
DO I=1,100
  DO J=1,100
    A(I,J)=A(I-1,J)+A(I,J-1)
```

```
END DO
END DO
```

In example program 3, each of two operands A(I−1,J) and A(I,J−1) has true dependence. There also exists pipelining parallelism, i.e. the processor which has completed an operation does another one. In this example, the statement "*HPF$ PROCESSORS P(10,10)" means two-dimensional (10×10) arrangement of the processors and naming the processor arrangement P. The statement "*HPF$ DISTRIBUTE A(BLOCK,BLOCK) onto P" means that an array called A which has already been declared is to be divided in one- and two-dimensional directions to form a mesh and placed in a processor called P (in a 10×10 processor mesh, in this example).

The following publications are concerned with techniques for increasing the speed of program execution by decomposing a loop onto a number of processors for parallel operation.

Japanese patent publication 61-182161 discloses a multi-processor computer system having basic components of a plurality of CPUs and a plurality of memory devices, the system comprising a stream bus for connecting the processors to form a loop, and means provided in each processor for reverse receiving messages in a particular direction relative to the stream bus, wherein a single processing proceeds while messages are being sent to each processor.

Japanese patent publication 4-184540 discloses a compiler for generating an object program from a given source program for a parallel computer system comprising a plurality of processors which are capable of parallel operation, wherein said source program is lexically decomposed for analysis, the result of which is used to recognize a syntax and generate an intermediate code, from which a loop structure is detected and the portion which can be executed in parallel is extracted. If the loop is a nested loop, then the data reference relation of each loop is analyzed. For the loop which does not have data references with another loop, parallel operations are performed.

Japanese patent publication 5-158895 discloses a parallel computer system with a plurality of computers connected, wherein a plurality of continuous loop calculations in a loop computer which have a dependence including value references between loops are distributed among the computers, and the data required by a computer due to the dependence is communicated to the computer.

Reference may also be had to "A Loop Transformation Theory and an Algorithm to Maximize Parallelism", IEEE Transactions on Parallel and Distributed Systems, Vol. 2, No. 4, October 1991.

Conventional techniques extract parallelism using only the program data dependence, and are generic, i.e. do no limit the structures of relevant multi-processors. However, the possibility of parallel operation obtained by such method is not equivalent to the one in multi-processors having distributed memory. That is, the parallelism with only data dependence considered enables parallel operations only when all operands have no data dependence. On the other hand, in multi-processors having distributed memory, it is possible to extract a greater parallelism when such technique as data prefetching and pipelining is employed. The possibility of parallel operation in distributed multi-processors is determined by the data dependence of each operand included in a loop. Specifically, a loop which allows parallel operation is configured with the following four types of operands:

(1) An operand which has no data dependence;
(2) An operand whose data dependence is not dependent between processors (between distributed memory areas);
(3) An operand which has only anti dependence across processors; and
(4) An operand which has only a true dependence vector across processors, with an element of the vector whose dimension actually spans processors and which does not have a negative dependence vector.

In the case (1), the loop is a do-all type and parallel operation is possible even in a distributed memory type multi-processor system.

In the case (2), data dependence is closed within an identical processor and parallel operation is possible if the dependence is maintained in the processor.

For every data dependence existing in a loop, if its dependence vector does not take a negative value, the loop is said to be a fully permutable loop, and the order of loop nests may be freely interchanged with each other. Since the operand in such loop takes only a positive value of data dependence vector, pipelining is applicable to the operand which has true dependence.

For distributed multi-processors, a more expanded definition, such as the one of (3) or (4), is possible. For the definition (3), for example, when a certain operand in a loop has anti dependence, prefetching is applicable.

SUMMARY OF THE INVENTION

It is an object of this invention to provide an expanded technique for parallel operations in a compiler in a multi-processor environment which enables parallel operations even on a loop having anti or true dependence that could in the prior art not be subjected to parallel operations in a program.

It is another object of the invention to provide a technique for effectively applying pipelining or prefetching to a loop having anti or true dependence.

To extract parallelism in distributed multi-processors, the present invention incorporates communication dependence which is an extension of data dependence and represents data dependence between processors, and accomplish both the foregoing and following objects:

(1) Detect an optimum communication method for each operand; and
(2) Detect the largest loop which can be executed in parallel.

The technique according to the invention comprises primarily the following five phases:

Target loop specifying section: This section detects a loop in a source program which is a candidate for parallelization.

Data dependence analyzing section: This section analyzes the data dependence of a loop detected by the target loop specifying section, to calculate data dependence vectors.

Iteration space decomposing section: This section decomposes all areas of the index to be executed by a loop.

Communication analyzing section: This section examines if each processor needs to transfer data to any other processor.

Communication dependence analyzing section: This section performs major processing of this invention, such as calculation of communication vectors and communication dependence vectors, and determination of the manners of operand communication and loop execution.

The foregoing and other objects, features and advantages of the invention will be apparent from the following more particular description of the preferred embodiment of the invention as illustrated in the drawings.

DESCRIPTION OF THE PREFERRED EMBODIMENT

The present invention will be described with reference to drawings.

A. Hardware organization

To carry out the invention, a multi-processor system is required which comprises a plurality of processors interconnected for passing data to each other. A multi-processor system can be divided into a distributed memory multi-processor system, as shown in FIG. 1, and a distributed memory multi-processor system, as shown in FIG. 2.

Figure 1:
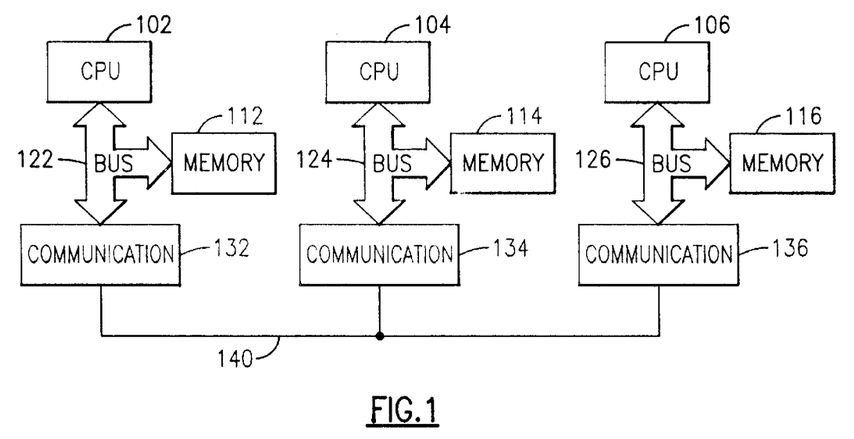
FIG. 1 is a block diagram showing the structure of distributed memory type multi-processors.
Figure 2:
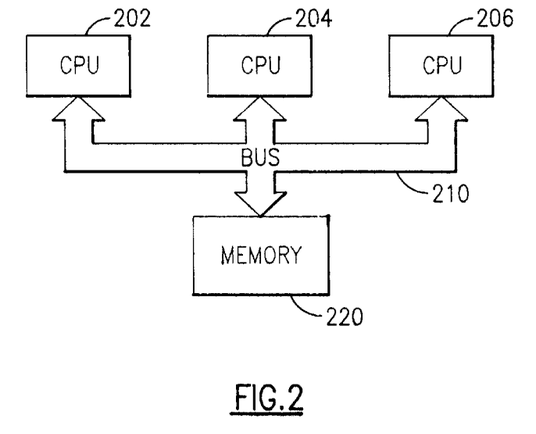
FIG. 2 is a block diagram showing the structure of distributed memory type multi-processors.

Referring to FIG. 1, there is shown a distributed memory type multi-processor system wherein a plurality of CPUs 102, 104, 106, . . . are connected with memories 112, 114, 116, . . . , respectively, via respective local buses 122, 124, 126, . . . , each of which being connected with each other via separate communication devices 132, 134, 136, . . . and a digital network.

The digital network is typically a local area network (LAN) and may be configured as a wide area network (WAN) via an Integrated Services Digital Network (ISDN) line. Thus, in the distributed memory type multi-processor system, the number of CPUs which can be interconnected is virtually unlimited. As such, a distributed processing program may preferably be created to perform matrix computations for huge arrays.

However, since data is passed between CPUs via a LAN or WAN communication line in a distributed memory type multi-processor system, communication processing may be costly.

Referring now to FIG. 2, there is shown a typical configuration of a distributed memory type multi-processor system. In the distributed memory type multi-processor system a plurality of CPUs 202, 204, 206, . . . are interconnected via a local bus 210, which is in turn connected with a distributed memory 220. Distributed memory 220 includes an exclusive area which is occupied by a separate CPU, for instance, and a common area which is accessed by a number of CPUs.

An advantage of the distributed memory type multi-processor system is that the cost of communication between CPUs is relatively small since CPUs are interconnected with a local bus. However, the needs for packaging a number of CPUs in a limited enclosure and for arbitrating accesses from a number of CPUs to the distributed bus will necessarily limit the number of CPUs which can be connected in the distributed memory type multi-processor system.

This invention is applicable not only to the manners of CPU connection in distributed or distributed memory type multi-processor systems, but to any system configured with a number of CPUs which can be communicated with each other.

B. Processing unit

Figure 3:
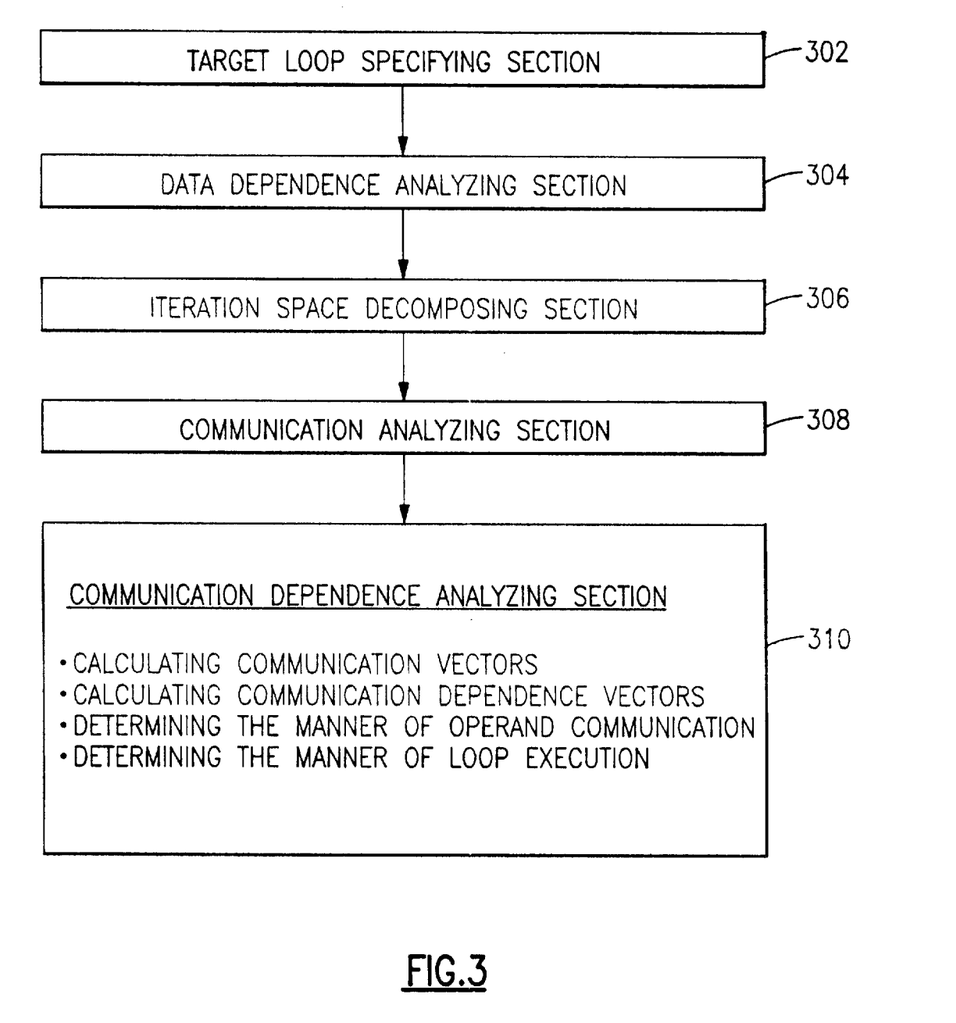
FIG. 3 is a block diagram showing a processing unit according to the present invention.

This invention is, in one embodiment, implemented as part of FORTRAN compiler functions which can generate code for parallel processing. The processing unit which performs processing related to the present invention can be classified into a target loop specifying section 302, data dependence analyzing section 304, iteration space decomposing section 306, communication analyzing section 308, and communication dependence analyzing section 310, as shown in FIG. 3. These are described in detail below. Actual testing is performed by the described four phases of target loop specifying section 302, data dependence analyzing section 304, iteration space decomposing section 306, and communication analyzing section 308.

(1) Target loop specifying section 302

This section extracts the maximum parallelism and enables data to be prefetched at the outermost of a loop by first subjecting the outermost loop in a program to optimization. By determining the communication dependence of respective operands included in the loop being specified, the manners of communication required by them can be determined. Each manner of communication also enables detection of parallelism of the whole loop. If the loop cannot be executed in parallel, the level of the loop to be analyzed is reduced by one, so that the maximum parallelism can be extracted.

Even when parallel operation is not possible, operands that can be prefetched allow for prefetch communication at the nest level of the loop. Thus, their communications are generated at that level, and they can be made not to be detected at a lower level. This provides the following advantages:

Communicating data can be vectorized in a larger unit than that of loop parallelism;

A number of communications of the same data can be avoided;

Parallelism can be improved by reducing data dependence of an inner loop; and

The speed of processing increases because of reduced operands to be tested in the inner loop.

Target loops are not limited to those generally described by the FORTRAN DO statement, but include the array representation of FORTRAN90 and the transformational intrinsic functions (TIF), such as SPREAD and CSHIFT. This is because, as described in Japanese patent application JA5-296269, the array representation of FORTRAN90 and TIF can be expanded into a DO-loop. More detailed specifications of FORTRAN90 itself are found in, for example, "FORTRAN90 HANDBOOK: Complete ANSI/ISO Reference", Jeanne C. Adams et al., McGraw Hill Inc.

(2) Data dependence analyzing section 304

This section is used to perform normal data dependence analysis for the loop determined by the target loop specifying section (1). As its result, it generates data dependence vectors, which represent the direction of dependence between iterations by true and anti dependences as +, − and 0. The vector relative to true dependence is called a true dependence vector and the one relative to anti dependence is called an anti dependence vector.

EXAMPLE PROGRAM 4

*HPF$ PROCESSORS P(4)
*HPF$ DISTRIBUTE A(BLOCK,*) onto P
DO J=2,99

```
        DO I=2,99
            A(I,J)=A(I+1,J)+A(I,J-1)
        END DO
    END DO
```

In example program 4, a data dependence vector of anti(0,1) can be detected for A(I+1,J) and of true(1,0) for A(I,J−1). The data dependence vector is described not by the sequence of the array index dimension but by the loop index dimension. So the dependence relative to index I in the first dimension of array A is described as the value of the second dimension of the data dependence vector.

(3) Iteration space decomposing section 306

To execute a loop in parallel, all areas of the loop index executed (iteration space) must be decomposed. For this, an iteration space decomposing technique called an "owner computes rule" is known and is used also in an embodiment of this invention. Details of the "owner computes rule" are described in "Process Decomposition through Locality of Reference", A. Rogers and K. Pingali, Proceedings of the SIGPLAN '89 Conference on Program Language Design and Implementation, June 1989. Briefly, this technique is to process the iteration space of a loop so that it meets the decomposition of the data on the left hand side of an assignment statement. Although this does not necessarily give an optimum solution, a fairly good result can be expected. Note that the present invention does not require as a prerequisite the use of the "owner computes rule" for iteration space decomposition, but any other suitable iteration space decomposing technique may be used.

Once iteration space decomposition is achieved as described above and a decomposed index area is assigned to each CPU, an array variable having an index assigned to a particular CPU (e.g. CPU102) will be placed in memory 112 in the organization of FIG. 1. In the organization of FIG. 2, on the other hand, an array variable having an index assigned to a particular CPU (e.g. CPU202) will be placed in an area, assigned to CPU202, of distributed memory 220.

When the "owner computes rule" is applied to said example 3, the first dimension index variable, I, of array A can take ranges decomposed as follows, since array A is decomposed onto four processors only in the first dimension.

Processor1=2 . . . 25
Processor2=26 . . . 50
Processor3=51 . . . 75
Processor4=76 . . . 99

(4) Communication analyzing section 308

This section determines what area of data should be read, compares it with its own data, and determines the data area to be communicated, in order to perform the iteration spaces being so decomposed that each processor can execute in parallel. The communicating data is the information represented by the array index.

In example program 4, it is necessary to read the area where the first operand on the right hand side is shifted by 1 in the direction of the first dimension by the succeeding processor. For the second operand on the right hand side, communication is not required since array A is not decomposed in the second dimension, though the operand is shifted by 1 in that direction.

(5) Communication dependence analyzing section 310

This section performs processing in the following four steps:

calculating communication vectors;
calculating communication dependence vectors;
determining the manner of operand communication; and
determining the manner of loop execution.

These steps will now be described.

(Calculating communication vectors)

From the communication information of each processor which is the result of the communication analyzing section, communication vectors are generated. Each of these vectors is the one which indicates whether interprocessor communication exists or not with 1 and 0 for each loop nest. The communication vector is determined as follows.

First, the communicating data is the information represented by the array index. The communication vector is a determination if communication occurs in the loop index space and can be calculated from the array index expression and communication information.

For example, in example program 4 shown above, communication of the first operand on the right hand side occurs as loop index I changes, but it will not occur with the change of loop index J. Loop index I corresponds to the second dimension in the loop nest. Thus, a communication vector of comm(0,1) can be calculated for A(I−1,J). Since communication is not required for A(I,J+1), the communication vector will be comm(0,0).

(Calculating communication dependence vectors)

Next step is to generate communication dependence vectors from true and anti dependence vectors, i.e. data dependence vectors, obtained by the data dependence analyzing section (2). The communication dependence vector can be a true communication dependence vector or anti communication dependence vector, which are calculated by ANDing a communication vector with a true dependence vector and anti dependence vector, respectively.

true communication dependence vector=true communication dependence vector & communication vector anti communication dependence vector=anti dependence vector & communication vector The truth table for this logical product & is as follows:

+ & 1=+
+ & 0=0
0 & 1=0
0 & 0=0
− & 1=−
− & 0=0

This logical product operation slightly differs from normal logical product operation and will be further described. The communication dependence vector represents the presence and absence of communication for each dimension of an array as 1 and 0 (1/0), respectively. The meaning of the logical product operation for communication dependence vectors is that a data dependence vector value is used as it is for the loop nest dimension where the communication dependence vector value is 1, and 0 is used for the loop nest dimension where the communication dependence vector value is 0. The element of each dimension of the data dependence vector takes a positive value, 0, or negative value, as described in conjunction with the dependence vector. Thus the values are described herein as +/0/−, since the sign of the element of each dimension has a meaning.

In example program 4, the communication dependence vector is calculated as:

For the first operand A(I+1,J),
data dependence vector: anti(0,1)
communication vector: comm(0,1), thus,
communication dependence vector: anti_comm(0,1).

Similarly, for the second operand A(I,J−1),
data dependence vector: true(0,1)
communication vector: comm(0,0), thus,
communication dependence vector: true_comm(0,0).
(Determining the manner of operand communication)

From the data calculated in this manner, it is determined how each operand can optimally be communicated. Basic manners of communication are the following four:

no communication;
prefetch communication: prefetching is possible before execution;
pipeline communication: used as a trigger for pipelining; and
synchronous communication: elements are communicated one after another as a loop is executed.

The logic for determining communication of each operand is as follows:

if communication vector=0
   then "no communication"
else if true communication dependence vector=0 & anti communication dependence vector=0
   then "prefetch communication"
else if true communication dependence vector=0 & anti communication dependence vector<>0
   then "prefetch communication"
else if true communication dependence vector<>0 & anti communication dependence vector=0 &
   if true communication dependence vector has no negative value
   then "pipeline communication"
else "synchronous communication"

(Determining the manner of loop execution)

Loop execution can be divided into the following three:
DO PARALLEL: a loop can be executed in parallel;
DO PIPELINE: a loop can be pipelined; and
DO SYNCHRONOUS: a loop cannot be executed in parallel.

If all operands in a loop are classified as "no communication" or "prefetch communication", then the loop can be executed in parallel.

If all operands in a loop include "no communication" or "prefetch communication" or one or more "pipeline communications", then the loop can be pipelined. By ORing the true communication dependence vectors of all operands which can be pipelined, all loop indices can be determined which execute pipelining. To describe the reason for ORing, pipeline communication is possible if a true communication dependence vector exists in a loop. At this time, it is necessary to determine the direction of dimension for performing pipeline communication which occurs before and after the execution of the loop. Thus, by ORing all true communication dependence vectors existing in the loop, the dimension is determined which requires pipeline communication.

Even when a single operand within a loop includes "synchronous communication", parallel operation is impossible.

In applying this invention to a general loop, parallel operation is virtually possible for the innermost loop, because the innermost loop must be a one-dimensional loop and the data dependence vector in such one-dimensional loop necessarily takes a positive value.

C. Process steps

Figure 4:
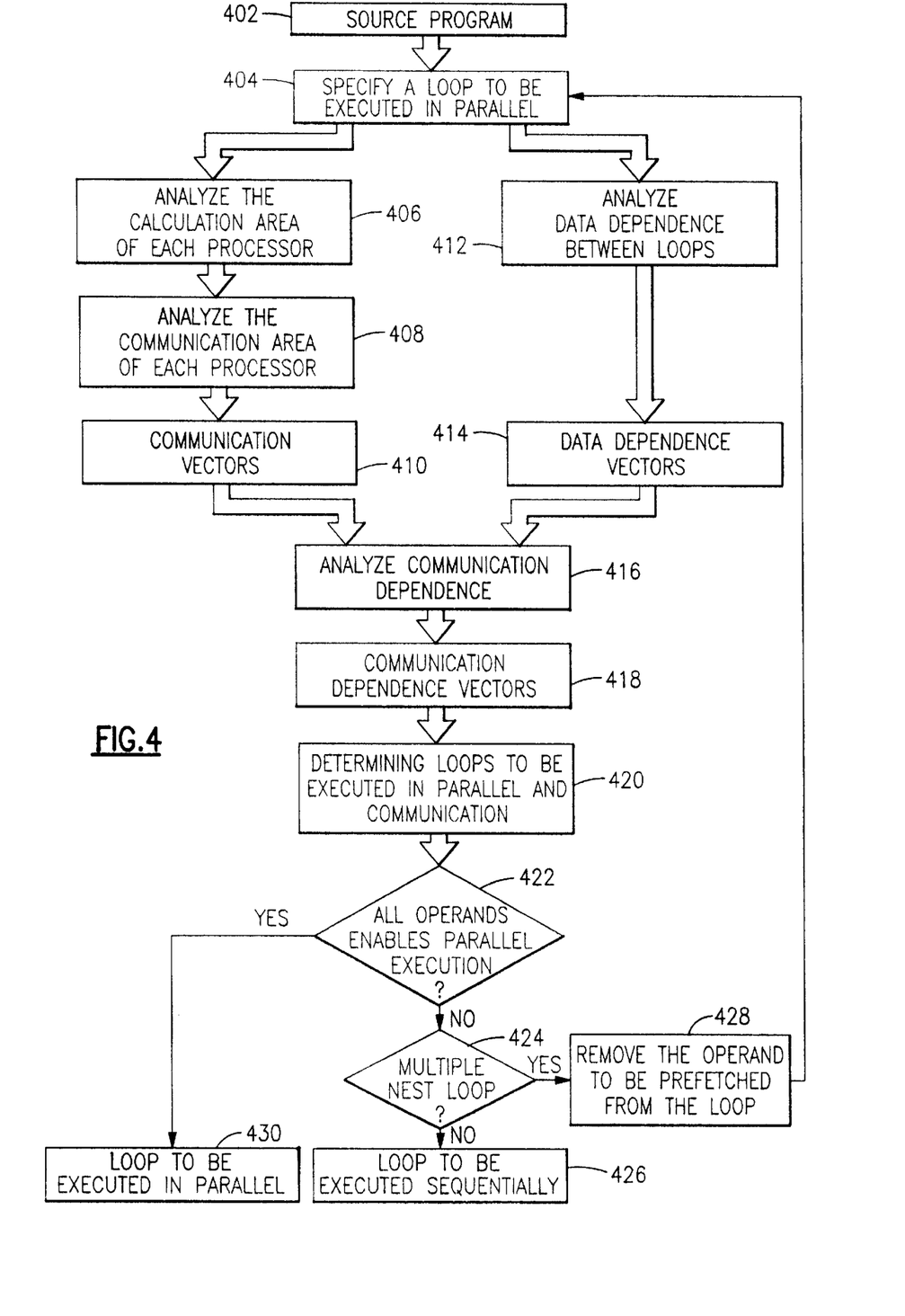
FIG. 4 is a flow diagram showing process steps according to the present invention.

Referring now to FIG. 4, a process for achieving parallel operation of a source program will be described. First, at step 402, a source program is inputted. In this embodiment a FORTRAN program is assumed.

Next, at step 404, the target loop specifying section shown in FIG. 3 is used to specify target loops.

When a loop is specified which is to be executed in parallel, the iteration space decomposing section 306 shown in FIG. 3 is used, at step 406, to analyze the calculation area of each processor. Next, at step 408, communication analyzing section 308 analyzes the communication area of each processor. The result of this analysis is used at step 410 to calculate communication vectors by communication dependence analyzing section 310.

At step 412, which is independent from step 406, the analysis of data dependence between loops is performed by data dependence analyzing section 304, based on the specified loop to be executed in parallel. The result of this is used at step 414 to calculate data dependence vectors.

Then at step 416, the communication vectors calculated at step 410 and the data dependence vectors calculated at step 418 are used to analyze communication dependence. Specifically, at step 416, the communication vectors are ANDed with the data dependence vectors. Then, at step 418, communication dependence vectors are obtained.

At step 420, based on the communication dependence vectors calculated in this manner, the loop to be executed in parallel and the communication is determined.

At step 422, based on the determination made at step 420, it is determined if all operands are to be executed in parallel. If so, a code specifying the loop to be executed in parallel is generated at step 430.

If the result of the test made at step 422 is negative, it is determined if the loop is a multiple nest loop at step 424. If so, any operand which can be prefetched is removed from the target loop. This processing means that a code is inserted outside the loop which specifies that the operand which can be prefetched is subjected to prefetch communication. Details of the processing will be described with reference to the following example program 5.

After step 428 is done, the process returns to step 404, where the processings which start from steps 406 and 412 are applied to the next inner loop inside the multiple nest loop.

Referring back to step 424, if the loop is not a multiple nest loop, a code specifying a loop to be sequentially executed is generated at step 426.

D. Example

The following uses a specific example to illustrate a method for extracting parallelism from a program.

EXAMPLE PROGRAM 5

*HPF$ PROCESSORS P(10)
*HPF$ DISTRIBUTE A(*,BLOCK) onto P
DO TIME=1,100
  DO J=2,99
    DO I=2,99
      A(I,J)=(A(I−1,J−1)+A(I+1,J−1)+
      A(I−1,J+1)+A(I+1,J+1))/4
    END DO
  END DO
END DO Example program 5 is part of coding for solving a partial differential equation using the SOR method (a difference method). While a general-purpose program runs to determine differences with left and right or preceding and succeeding cells, the above program has complex data dependence, turning to diagonal cells. Ten executing processors are used to decompose array A in the second-dimensional direction.

First, parallelism for the whole target loop is extracted. In this example, a three-fold loop of (TIME,J,I) is a target loop and processed to extract parallelism.
The data dependence of each operand will be as follows:

| A(I−1,J−1) | true(+,1,1) | anti(+,−1,−1) |
| A(I−1,J+1) | true(+,1,−1) | anti(+,−1,1) |
| A(I+1,J−1) | true(+,−1,1) | anti(+,1,−1) |
| A(I+1,J+1) | true(+,−1,−1) | anti(+,1,1) |

Then communication vectors are determined as follows:

| A(I−1,J−1) | comm(1,1,0) |
| A(I−1,J+1) | comm(1,1,0) |
| A(I+1,J−1) | comm(1,1,0) |
| A(I+1,J+1) | comm(1,1,0) |

Thus, communication dependence vectors are obtained as follows:

| A(I−1,J−1) | true_comm(+,1,0) | anti_comm(+,−1,0) |
| A(I−1,J+1) | true_comm(+,1,0) | anti_comm(+,−1,0) |
| A(I+1,J−1) | true_comm(+,−1,0) | anti_comm(+,1,0) |
| A(I+1,J+1) | true_comm(+,−1,0) | anti_comm(+,1,0) |

The above result shows that all four operands are classified as "synchronous communication", the class of this loop will be "do synchronous". Since all operands cannot be prefetched, this nest level does not enable prefetch communication. Additionally, neither operand can be removed as a target for analysis with a nest reduced by a single level.

Next, an inner two-fold loop of (I,J) is taken for parallelism extraction. In this case, data dependence vectors are as follows:

| A(I−1,J−1) | true(1,1) |
| A(I−1,J+1) | true(1,−1) |
| A(I+1,J−1) | anti(1,−1) |
| A(I+1,J+1) | anti(1,1) |

Communication vectors are as follows:

| A(I−1,J−1) | comm(1,0) |
| A(I−1,J+1) | comm(1,0) |
| A(I+1,J−1) | comm(1,0) |
| A(I+1,J+1) | comm(1,0) |

Thus, communication dependence vectors are obtained as follows:

| A(I−1,J−1) | true_comm(1,0) |
| A(I−1,J+1) | true_comm(1,0) |
| A(I+1,J−1) | anti_comm(1,0) |
| A(I+1,J+1) | anti_comm(1,0) |

With this result, the manner of communication is determined for each operand:

| A(I−1,J−1) | true(1,1) |
|            | true_comm(1,0) |
| A(I−1,J+1) | true(1,−1) |
|            | true_comm(1,0) |

These two operands are those which allow for pipeline communication.

| A(I+1,J−1) | anti(1,−1) |
|            | anti_comm(1,0) |
| A(I+1,J+1) | anti(1,1) |
|            | anti_comm(1,0) |

Since these two operands are those which allow for prefetching, it can be known that the whole loop enables pipelining. ORing the true communication dependence vectors of these two operands which allow pipeline communication gives:
true_comm(1,0) I true_comm(1,0)→true_comm(1,0)
From this result, it is seen that only the J loop is needed for pipelining.
Thus, it is possible to generate parallel coding for distributed multi-processors as follows:

```
*HPF$ PROCESSORS P(10)
*HPF$ DISTRIBUTE A(*,BLOCK) onto P
DO TIME=1,100
    Prefetch communicate A(I+1,J−1) and A(I+1,J+1)
    Pipeline receive A(I−1,J−1) and A(I−1,J+1)
    DO-pipeline J=LB(ProcID),UB(ProcID)
        DO-parallel I=2,99
        A(I,J)=(A(I−1,J−1)+A(I+1,J−1)+
            A(I−1,J+1)+A(I+1,J+1))/4
        END DO
    END DO
    Pipeline send A(I−1,J−1) and A(I−1,J+1)
END DO
```

In this formula, ProcID denotes each processor number, and in each processor LB(ProcID) and UB(ProcID) are replaced with index values according to the following table.

TABLE 1

| procID | 1 | 2 | 3 | 4 |
|---|---|---|---|---|
| LB | 2 | 26 | 51 | 76 |
| UB | 25 | 50 | 75 | 99 |

This program provides for parallel operation of all 10 processors.

In the parallel coding for multi-processors, the index range for the portions;
  Prefetch communicate A(I+1,J−1) and A(I+1,J+1),
  Pipeline receive A(I−1,J−1) and A(I−1,J+1), and
  Pipeline send A(I−1,J−1) and A(I−1,J+1) is not described.
  The index I ranges from 2 to 99. Also note that the index J has different indices executed depending on respective processors, as shown in Table 1.
The processing described as "prefetch communicate" is to specify that one processor has another processor communicate the array data associated with a necessary index outside the two-fold loop, before the first processor performs operation within the two-fold loop without requiring prefetching.
The processing described as "pipeline receive" is the one performed by one processor for receiving from another processor immediately preceding in the sequence of pipelining the array data associated with a necessary index before the first processor performs pipelining.

The processing described as "pipeline send" is the one performed by one processor for sending to another processor immediately succeeding in the sequence of pipelining the array data associated with a necessary index after completing an operation and passing the operation to the succeeding processor. This enables the first processor to proceed to the next processing.

While conventional techniques use only given constraint due to dependence in order to extract parallelism, the present invention additionally takes into account communications in a distributed memory environment and effectively utilize communication dependence to achieve the following two objectives at the same time:

Detecting an optimum communication method for each operand; and

Extracting a loop which can be executed in the largest parallelism.

In the aforementioned embodiment, although the example has been discussed which extracts parallelism by performing computations in an order of data dependence vectors, communication vectors, and communication dependence vectors, since the user has specified data decomposition, it is also possible to provide an automatic data decomposition function which can lead to the maximum parallelism by performing computations in an order of:

data dependence vectors;

communication dependence vectors which can be executed in parallel;

communication vectors; and processor decomposition.

In this case, data dependence vectors are first determined to detect the dimension which inhibits parallel operation. By masking the dimension, communication dependence vectors are generated which can be executed in parallel. Further, this mask information becomes communication vectors.

At that time, it is necessary to consider whether a target program, after pipelining, permits sufficient parallelism of processors to be extracted. This can be tested by determining if a target loop, after being executed, comes up to a loop which can be pipelined or executed in parallel.

Furthermore, the index expression determined from communication vectors and arrays allows calculation of processor decomposition. This alternative technique is also able to extract the maximum parallelism by repeating a target loop from its outer to inner until it can be executed in parallel, similarly to said embodiment.

While the embodiment has been described in reference to HPF (a parallel processing language based on FORTRAN90), the present invention is not limited to such particular programming language, but applicable to any language processing system which supports parallel processing in a multi-processor environment, such as APL and C* (a parallel programming language based on C).

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. In a computer having a plurality of processors, a method for increasing the speed of program execution by decomposing loops in a source program onto the processors and having said processors execute them in parallel, said method comprising the steps of:

(a) reading the source program;

(b) specifying a loop to be executed in parallel in said source program;

(c) determining data dependence vectors indicating true and anti dependences relatives to said loop being specified;

(d) decomposing the iteration spaces of said loop and assigning the spaces to said plurality of processors;

(e) determining the area of each iteration space assigned to said plurality of processors where data is required to be read from any other processor for parallel processing;

(f) calculating communication vectors based on information on the area of said iteration space which has been determined that data is required to be read from any other processor, said vectors are the ones which indicate whether interprocessor communication exists or not for each loop;

(g) calculating communication dependence vectors based on said data dependence vectors and said communication vectors, said dependence vectors are calculated by ANDing said communication vectors with said dependence vectors;

(h) determining the manner of communication based on the values of said communication dependence vectors; and (i) generating codes for specifying communication and loop execution methods by detecting the method of communication between respective operands, based on said manner of communication being determined.

2. The method for parallel execution of a program according to claim 1, further comprising the step of sequentially applying steps (e) to (i) from outer to inner loops if said loop is a nested loop.

3. The method for parallel execution of a program according to claim 2, further comprising the step of removing such operand as can be prefetched from a target loop in said nested loop in response to the finding of the loop which can be prefetched and inserting a code outside said nested loop which specifies that the operand can be prefetched.

4. The method for parallel execution of a program according to claim 1 wherein said method of communication is either prefetch communication, pipeline sending, or pipeline receiving.

5. The method for parallel execution of a program according to claim 1 wherein said method of loop execution is either parallel operation, pipeline operation, or operation which cannot be made parallel.

6. The method for parallel execution of a program according to claim 1 wherein said source program includes the number of processors used and a statement for assigning the arrays in the loop to said processors.

7. The method for parallel execution of a program according to claim 1 wherein said AND operation is performed in accordance with a rule indicated by a truth table:

+ & 1=+
+ & 0=0
0 & 1=0
0 & 0=0
− & 1=−
− & 0=0 where +, − and 0 are values which the components of data dependence vectors can assume, and 1 and 0 are values which the components of communication vectors can assume.

8. In a computer having a plurality of processors, a compiler including a processing unit for increasing the speed of program execution by decomposing loops in a source program onto the processors and having said processors execute them in parallel, said compiler comprising:

(a) means for reading the source program;

(b) means for specifying a loop to be executed in parallel in said source program;

(c) means for determining data dependence vectors indicating true and anti dependences relative to said loop being specified;

(d) means for decomposing the iteration spaces of said loop and assigning the spaces to said plurality of processors;

(e) means for determining the area of each iteration space assigned to said plurality of processors where data is required to be read from any other processor for parallel processing;

(f) means for calculating communication vectors based on information on the area of said iteration space which has been determined that data is required to be read from any other processor, said vectors are the ones which indicate whether interprocessor communication exists or not for each loop;

(g) means for calculating communication dependence vectors based on said data dependence vectors and said communication vectors, said dependence vectors are calculated by ANDing said communication vectors with said dependence vectors;

(h) means for determining the manner of communication based on the values of said communication dependence vectors; and (i) means for generating codes for specifying communication and loop execution methods by detecting the method of communication between respective operands, based on said manner of communication being determined.

9. The compiler according to claim 8, further comprising means for sequentially applying means (e) to (i) from outer to inner loops if said loop is a nested loop.

10. The compiler according to claim 8 wherein said method of communication is either prefetch communication, pipeline sending, or pipeline receiving.

11. The compiler according to claim 8 wherein said method of loop execution is either parallel operation, pipeline operation, or operation which cannot be made parallel.

12. The compiler according to claim 8 wherein said AND operation is performed in accordance with a rule indicated by a truth table:

+ & 1=+

+ & 0=0

0 & 1=0

0 & 0=0

− & 1=−

− & 0=0 where +, − and 0 are values which the components of data dependence vectors can assume, and 1 and 0 are values which the components of communication vectors can assume.

13. The compiler according to claim 8 wherein said source program includes the number of processors used and a statement for assigning the arrays in the loop to said processors.

14. The compiler according to claim 13 wherein said source program is a FORTRAN code.

15. The compiler according to claim 14 wherein said source program is a FORTRAN90 code.

16. The compiler according to claim 15 wherein said means for specifying a loop to be executed in parallel includes means for specifying array representations in the source program and TIF as loops.

* * * * *